United States Patent [19]

Stich

[11] Patent Number: 4,659,973
[45] Date of Patent: Apr. 21, 1987

[54] BRUSHLESS EXCITER FOR CONTROLLING EXCITATION OF A SYNCHRONOUS MACHINE

[75] Inventor: Frederick A. Stich, Milwaukee, Wis.

[73] Assignee: Siemens Energy & Automation, Inc., Atlanta, Ga.

[21] Appl. No.: 858,361

[22] Filed: Apr. 30, 1986

[51] Int. Cl.⁴ .............................................. H02P 5/40
[52] U.S. Cl. .................................... 318/718; 318/712
[58] Field of Search ................................ 318/710–719

[56] References Cited

U.S. PATENT DOCUMENTS

| | | | |
|---|---|---|---|
| 3,350,613 | 10/1967 | Brockman et al. | 318/718 |
| 3,573,577 | 4/1971 | Boyd. | |
| 3,811,196 | 4/1968 | Larose. | |
| 4,027,216 | 5/1977 | Rozek | 318/712 |
| 4,038,589 | 7/1977 | Heyne et al. | 318/718 |
| 4,422,028 | 12/1983 | Godwin et al. | 318/718 |

Primary Examiner—David Smith, Jr.
Attorney, Agent, or Firm—Volker R. Ulbrich

[57] ABSTRACT

A brushless exciter is provided for controlling excitation of a synchronous motor. The brushless exciter uses a center tapped rotating transformer, a discharge resistor, a field winding which has one end coupled to the ends of the rotating transformer and the other end connected to the discharge resistor and center tap of the rotating transformer. Four power SCR's are used in the brushless exciter. The electronics for controllably firing the SCR's and applying and removing the field are arranged in modules. A field current regulator module is located externally of the rotating apparatus for external control and contains circuitry for field forcing. The circuitry controls the application of field current and the level of excitation. The circuitry monitors the presence, frequency and phase angle of the discharge current and determines the time for field application and removal.

34 Claims, 12 Drawing Figures

BRUSHLESS EXCITER FOR CONTROLLING EXCITATION OF A SYNCHRONOUS MACHINE

CROSS-REFERENCE TO RELATED APPLICATIONS

This application is related to co-filed applications Ser. No. 855,512 filed Apr. 23, 1986, "Electronic Assembly For A Brushless Exciter Including Fan and Heat Sink", J. T. McKean; and Ser. No. 924,688, filed Oct. 29, 1986, "Rotating Transformer For Brushless Excitation of a Synchronous Motor", S. C. Lindholm.

BACKGROUND OF THE INVENTION

This invention relates generally to control systems for synchronous motors and more particularly to a control system for controlling the excitation to the rotating field winding of a synchronous motor without brushes.

Synchronous motors have a stator winding energized with a.c. current to produce a rotating magnetic field and a field winding energized with d.c. current to produce a unidirectional magnetic field which interacts with the rotating field to cause the rotor to rotate in synchronism with the frequency of the a.c. current. When starting a synchronous motor, the stator winding acts as a primary winding and the field winding as a secondary winding of a transformer. High voltages can be induced in the field winding which adversely effects the winding insulation and winding life. In order to eliminate this undesirable effect, the field winding is closed through a field discharge resistance during starting, and just before or after synchronization the field discharge resistance circuit is opened to avoid current drain from the excitation source.

Synchronous motor starting systems usually provide means for controlling the time that excitation is applied to the field winding. Most systems utilize means responding to the induced current in the field winding during the starting period. The induced current is sensed and when its frequency reaches a predetermined low value, the system operates to connect the excitation power source to the field winding.

A control system for a synchronous motor typically has a field discharge resistance circuit for discharging field current during the start-up period and a d.c. excitation circuit for energizing the motor field winding at synchronous speed as well as just prior to synchronization in order to develop the torque required to synchronize the motor. Rotor mounted rectifiers for supplying the d.c. excitation are well known in the art and semi-conductor switching means are used for controlling insertion of the field discharge resistance in circuit within the motor field winding whenever the induced field voltage rises to a predetermined value above the excitation voltage in order to prevent the voltage induced in the field winding during start-up from exceeding the peak reversed voltage rating and damaging the rectifiers and the winding insulation.

If the field is applied under the most favorable conditions of speed and rotor angle, the motor has the best chance of pulling into synchronism. If the direct current application is not precisely timed, the motor may slip back from synchronism and be tripped from the line, or the stator may momentarily draw greater power from the line than desired. The most favorable rotor angle occurs very near the point where the induced field current is zero and has just changed in polarity since at this moment the stator and rotor flux linkages are maximum and excitation current will build up rapidly if the d.c. is applied to the field.

U.S. Pat. No. 3,381,196 by Jerard M. LaRose, which issued on Apr. 30, 1968, discloses a control system for a brushless synchronous motor. The control system utilizes semi-conductor exciter switch means, such as an SCR, for applying excitation to the field winding which withholds excitation during start-up. The control system includes slip frequency and just as the slip voltage is reversing from a positive to a negative polarity. The control system uses semi-conductor switch means for inserting and removing the field discharge resistor and it applies a gating pulse to the exciter switch SCR which connects excitation to the field winding at a phase point of the slip voltage which assures reverse biasing of the field discharge resistor semi-conductor switch. Thus, the discharge resistance is removed when d.c. excitation current starts to flow into the field winding. When the SCR's are used to apply excitation to the field windind in this manner, the motor may fail to pull into synchronism if the SCRs are commutated off during the negative half cycle of the slip voltage. Further, the slip frequency sensing means of the control system may see a relatively high constant frequency voltage generated in the field winding under certain fault conditions, such as one phase of the stator winding being unbalanced, and such constant frequency signal prevents application of excitation to the field winding because the slip voltage frequency, as seen by the sensing means, never diminishes to the predetermined optimum fequency at which the gating signal is generated for firing the SCR.

U.S. Pat. No. 3,573,577 by Donald R. Boyd, which issued on Apr. 6, 1971, discloses a brushless synchronous motor control system which uses control semi-conductor exciter switch means which prevents the exciter means from being commutated off before the motor pulls into synchronism. The control system assures that the motor will pull into synchronism on reluctance starting even if a motor fault results in the generation of a constant frequency voltage in the field winding. The control system has a number of thyristors for connecting a d.c. source to the field winding and means for sensing when motor speed and rotor angle are most favorable for applying excitation. The system also has oscillator means controlled by the sensing means for applying a succession of gating pulses to the thyristors to prevent them from being commutated off before the motor pulls into synchronism. Semi-conductor switching means control insertion of the field discharge resistance in circuit with the field winding and an impedance in shunt with the switching means is selected so that the current through it and the field discharge resistance in series is greater when the switching means is open than the holding current of the thyristors thereby assuring that the thyristors are not commutated off before the motor synchronizes. The prior art exciters contain five SCR's which generate heat during operation. This heat must be dissipated using a heat sink which makes the structure more elaborate. It can be appreciated that it would be highly desirable to provide a brushless exciter which uses fewer than five SCR's and uses a simple heat sink. It is also highly desirable to have a simple exciter which can be controlled directly and one in which the amount of excitation can be controlled. It is also highly desirable to have an exciter which provides for field removal and reapplication during pull-out and resynchronization.

Accordingly, it is an object of the present invention to provide an apparatus for controlling the excitation of a synchronous machine without using brushes.

Another object of the present invention is to minimize the number of power components required for the exciter.

Still another object of the present invention is to provide a control which provides for field removal and reapplication during pull-out and resynchronization.

SUMMARY OF THE INVENTION

Briefly stated, in accordance with one aspect of the invention, the foregoing objects are achieved by providing a brushless exciter for controlling excitation of a synchronous machine. The brushless exciter includes a rotating transformer, a discharge resistor, and a field winding coupled to the rotating transformer and to the discharge resistor. First and second SCR's are serially connected to the field winding and rotating transformer and third and fourth SCR's are serially connected to the field winding and the discharge resistor. The brushless exciter includes first means for controlling the firing of the third and fourth SCR's in response to sensing the induced field voltage. Also included are second means for controlling the firing of the first SCR and controlling the application of field current and level of excitation. Third means are provided for controlling the firing of the second SCR and controlling the application of field current and level of excitation. Fourth means are provided for monitoring the presence, frequency and phase angle of the discharge current and determining the time for field application and removal.

BRIEF DESCRIPTION OF THE DRAWINGS

While the specification concludes with claims particularly pointing out and distinctly claiming the subject matter which is regarded as the invention, it is believed that the invention will be better understood from the following description of the referred embodiment taken in conjunction with the accompanying drawings in which:

FIG. 4a is connected along line IVb—IVb to FIG. 4b and along line V—V to FIG. 5 and FIG. 4b is connected along line IVa—IVa to FIG. 4a and along line IIIb—IIIb to FIG. 3b.

DESCRIPTION OF THE PREFERRED EMBODIMENT

Figure 1:
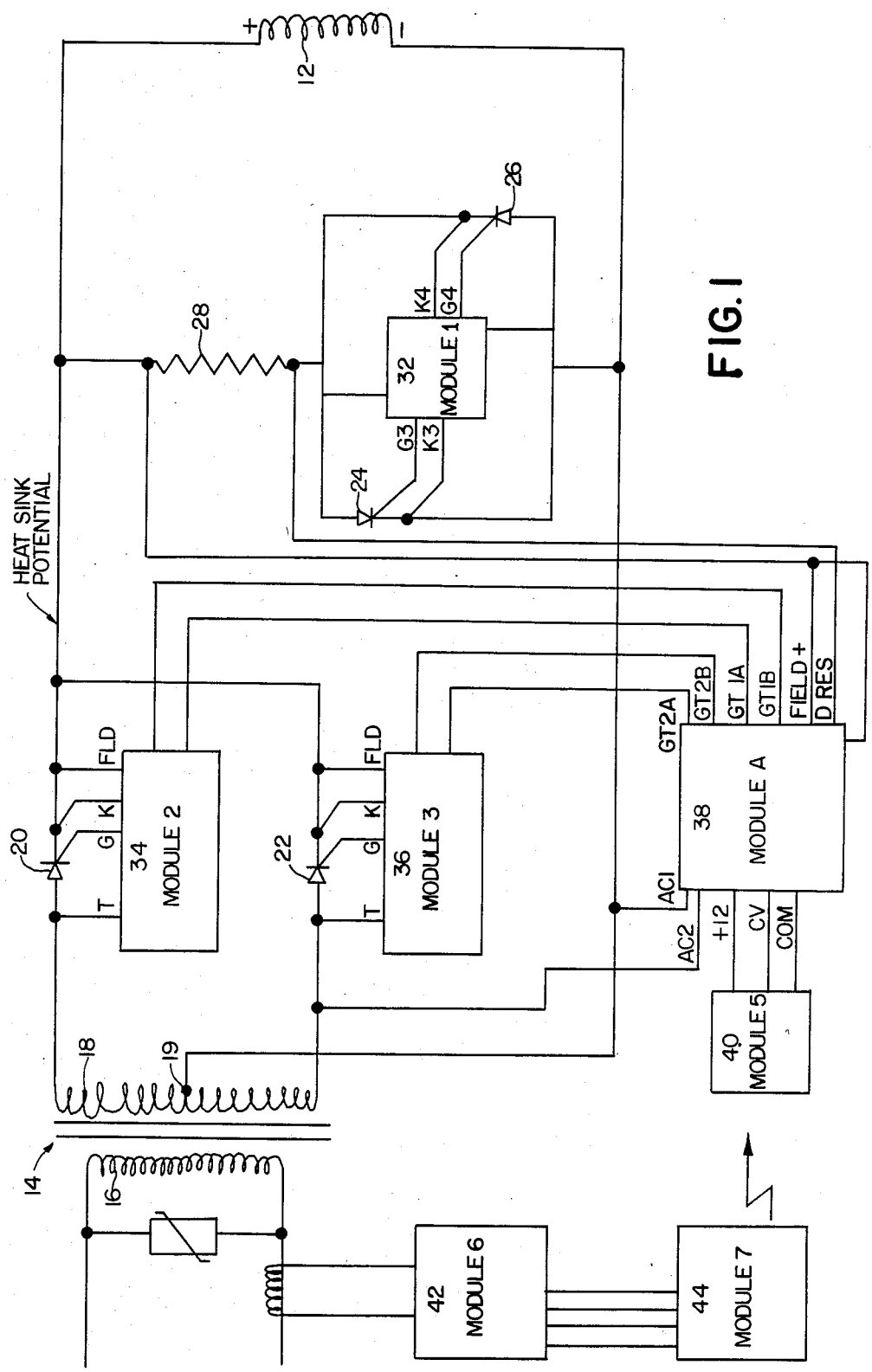
FIG. 1 is a block diagram of a brushless exciter in accordance with the present invention.

Referring to FIG. 1, a brushless exciter is provided for controlling the excitation of a synchronous machine, such as a three-phase synchronous motor 10. The three-phase synchronous motor 10 has a three-phase stator winding (not shown) and a field winding 12. As is known in the art, the stator winding is energized from a suitable three-phase a.c. source and produces a rotating magnetic flux field in the air gap of the motor which interacts with the motor field winding to produce start-up and synchronous operating torque for the motor 10.

The field winding 12 is coupled to a rotating transformer 14 which is an excitation source for supplying unidirectional current to the field winding 12. The rotating transformer 14 has a primary winding 16 which is connected to a suitable source of single-phase alternating current. The secondary winding 18 of the rotating transformer has a center tap 19 which is connected to one end of the field winding 12. The other end of the field winding 12 is coupled to the ends of the secondary winding 18. As is known in the art, the rotating transformer is a single-phase shell type transformer with an air gap. The motor has the general configuration of a spool of thread with the spool being made of electrical core steel and the thread being the secondary winding 18. A stator which is constructed as the inverse of the rotor provides the remainder of the magnetic circuit and the primary transformer winding 16.

The rotating transformer 14 with the center tapped secondary winding 18 requires only four power SCR's 20, 22, 24 and 26. SCR's 20 and 22 have one pole at a common potential to simplify the rotating assembly and because they are not contained in isolating modules because of electrical requirements. On the other hand, SCR's 24 and 26 are preferably contained in a single module with built-in isolation to the mounting base. The first and second SCR's 20, 22 are each connected in series with and between the field winding 12 and the secondary 18 of the rotating transformer 14. The third and fourth SCR's 24, 26 are each connected in series with and between the field winding 12 and a discharge resistor 28 and are connected to each other in anti-parallel fashion forming a loop with the anode of one SCR connected to the cathode of the other SCR. SCR's 20 and 22 serve the functions of controlling the application of field current and also the level of excitation. SCR's 24 and 26 control the discharge energy of the field during synchronous starting. This energy is dissipated by the discharge resistor 28.

The SCR's 20, 22, 24 and 26 are preferably mounted on a heat sink 30 which is a rotating element. The heat sink and cooling fan are discussed more fully in co-filed application Ser. No. 924,688 filed Oct. 29, 1986 "Rotating Transformer For Brushless Excitation of a Synchronous Motor" by Steve C. Lindholm and Ser. No. 855,512 filed Apr. 23, 1986 "Electronic Assembly For a Brushless Exciter" by Joseph T. McKean, which are assigned to the assignee of this application. These applications are incorporated herein by reference. Other features of a brushless excitation system are discussed in a publication by J. L. Cragg entitled "New Synchronous Motor Brushless Excitation System" which is IEEE Conference Paper No. PC168-41.

As will be discussed more fully hereinbelow, this brushless excitation system offers control of the rotating exciter output from a stationary control box and provides field forcing. Field removal and reapplication during pull-out and resynchronization is also provided. In addition, the power circuit has been simplified and the number of power components reduced which reduces the heat generated by the power components and makes for a simpler arrangement which facilitates the packaging.

The electronics for the brushless exciter are conveniently packaged in seven modules 32, 34, 36, 38, 40, 42 and 44. Modules 1, 2 and 3, 32, 34 and 36 are preferably mounted on the heat sink 30. Modules 4 and 5, 38, 40 may also be mounted on the heat sink 30. Modules 1 through 5 are rotating components. Modules 6 and 7 may be conveniently mounted outside the rotating structure.

Module 1, 32 is the field discharge module which is connected to the gates of the third and fourth SCR's 24, 26. The first module 32 controls the firing of the third and fourth SCR's 24, 26 in response to sensing the induced field voltage. This operation is independent of the rest of the control circuitry.

Modules 2 and 3, 34, 36 are identical and contain the gate pulse transformes and snubber circuits. Modules 2 and 3, 34, 36 are connected to the first and second SCR's 20, 22. SCR's 24 and 26 do not require gate pulse transformers since their gate circuit is directly connected. Gate pulses are generated in response to the instantaneous voltage level appearing across SCR's 24 and 26. When the SCR voltage exceeds a certain breakdown voltage, as will be more fully explained hereinafter, a gate pulse is generated at the gate of the SCR with the positive anode voltage. The second module 34 is connected to the gate of the first SCR 20 for controllably firing the first SCR 20 and controlling the application of field current and level of excitation. The third control module 36 is connected to the gate of the second SCR 22 for controllably firing the second SCR 22 and controlling the application of field current and level of excitation.

The fourth control module 38 is connected to the first, second and third control modules 32, 34 and 36, the field winding 12, the discharge resistor 28 and the secondary winding 18 of the center tapped rotating transformer 14. The fourth control module 38 monitors the presence, frequency and phase angle of the discharge current for determining the time for field application and removal and provides phase control signals responsive to a transmitted error signal.

The fifth control module 40 is connected to the fourth control module 38. The fifth control module 40 receives an error signal and converts the signal to a variable d.c. level which is input to the phase control portion of the fourth module 38.

The sixth control module 42 is connected to the primary winding 16 of the rotating transformer 14 for comparing the magnitude of a sampled excitation current to a reference magnitude and generating an error signal when the magnitude of the sample current exceeds the reference magnitude. The primary current of the rotating transformer and the excitation d.c. current are almost linearly related deviating only because of the non-ideal transformer characteristics.

The seventh control module 44 is coupled to the fifth control module 40 and connected to the sixth control module 42 for coupling the error signal to the fourth control module 38. Control module 7 is a transmitter and control module 5 is a receiver for receiving the error signal transmitted by the seventh control module. Control module 7 is stationay and has an antenna which transmits the signal a short distance to the rotating antenna of control module 5.

The field application control module 4 monitors the presence and frequency and phase angle of the discharge current to determine the proper time point for field application and removal. The excitation current is monitored on the primary of the rotating transformer. The field regulator circuit compares the sampled excitation current to an externally supplied design value and generates an error signal. A transmitter receiver combination couples the error signal into the rotating circuits. There, the phase control circuit converts to properly timed firing impulses for SCR 20 and SCR 22 after synchronization has been achieved.

Figure 6:
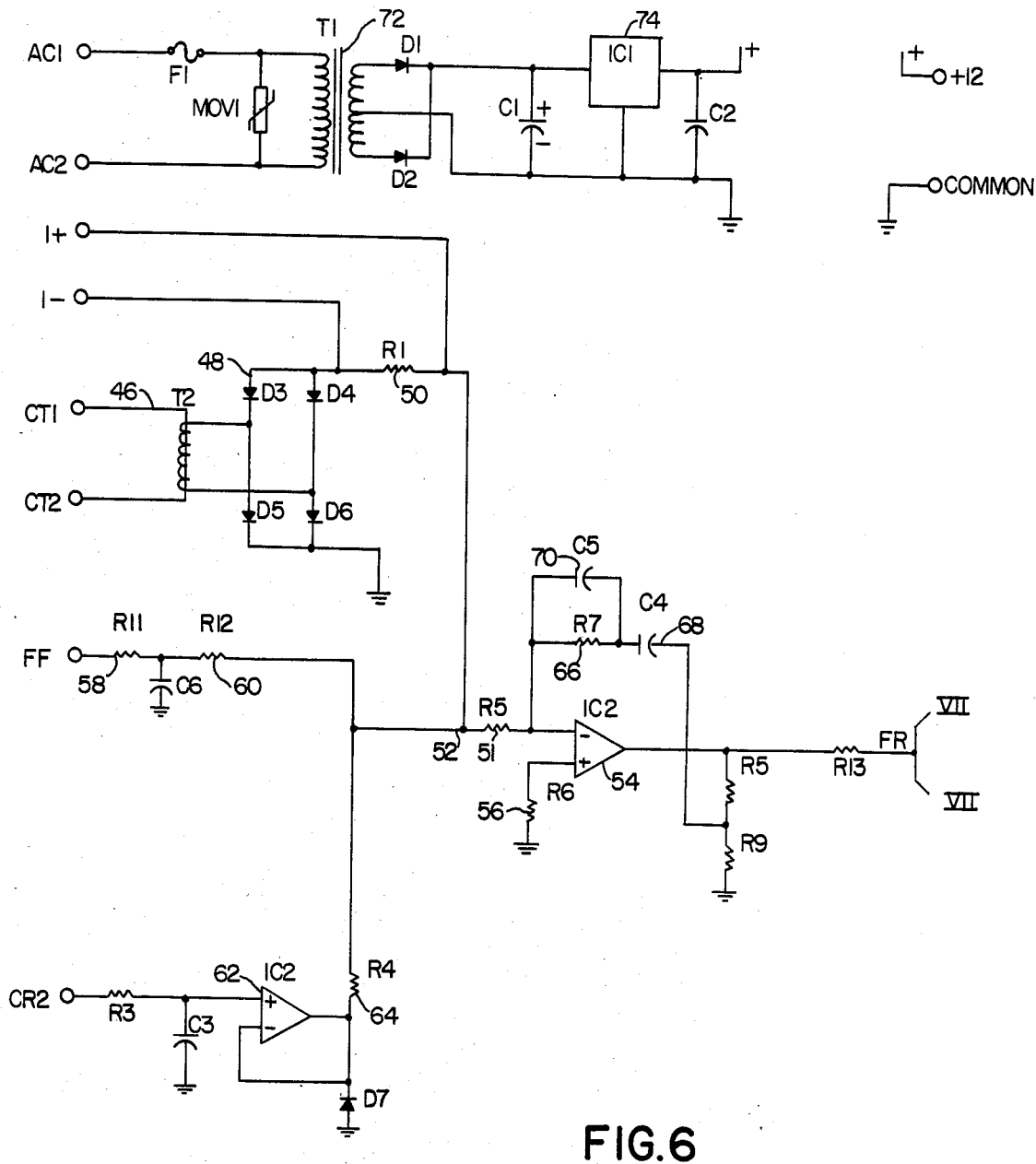
FIG. 6 is connected along line VII—VII to FIG. 7 and schematically illustrates control module 6 which contains the field current regulator and stationary power supply.

Referring to FIG. 6, the details of module 6 are revealed showing the field regulator circuit. Transformer 46 is an auxiliary CT which reduces the sample current level. The shape of the sample current is a square wave because of the high inductance of the field circuit. The secondary winding of the auxiliary CT 46 is connected to a bridge rectifier 48 which produces a full-wave rectified d.c. signal. The output of the bridge rectifier 48 is fed through a resistor 50 and a resistor 51 to the input of regulator amplifier 54. The non-inverting input to amplifer 54 is always common potential obtained through resistor 56. The current regulator reference is the sum of the currents flowing through resistors 60 and 64. Because the average voltage at node 52 is at zero potential during regulated operation, the current reference is equal to the voltage at terminal FF divided by the sum of resistances 58 plus 60 plus the voltage at terminal CR2 divided by the resistance 64: VFF/(R58+R60)+VCR2/(R64). One or both terminals, FF and CR2, may be used. The error between the sampled and reference signals is amplified by the amplifier 54 and an output is provided over line FR. The current signal is transformed by auxiliary current transformer 46 and full-wave rectifier diode bridge 48. The resulting current signal is sourced from reference amplifier 62 through resistor 64 flowing into the diode bridge 48. The current regulator action tends to maintain the node between the diode bridge 48 and resistor 64 at ground potential since the regulating amplifier 54 is referenced to ground through resistor 56. The regulating amplifier 54 has several features of note. One feature is the negative feedback which consists of resistor 66 and capacitors 68 and 70. These elements in conjunction with resistor 64 determine the proportional and integrating feedback characteristics of the regulator.

Module 6 also contains the power supply for the system. The power is input to transformer 72 which steps down and isolates the input source. The secondary of the transformers 72 is center-tapped, full-wave rectifier and filtered, producing a nominal 24-volt d.c. The unregulated d.c. voltage is for driving the gates of the SCR's 20 and 22 as well as feeding the 12-volt regulator circuit. Ingetrated circuit 74 is a three-terminal, series pass regulator which provides a fixed 12-volt d.c. at its output.

Figure 7:
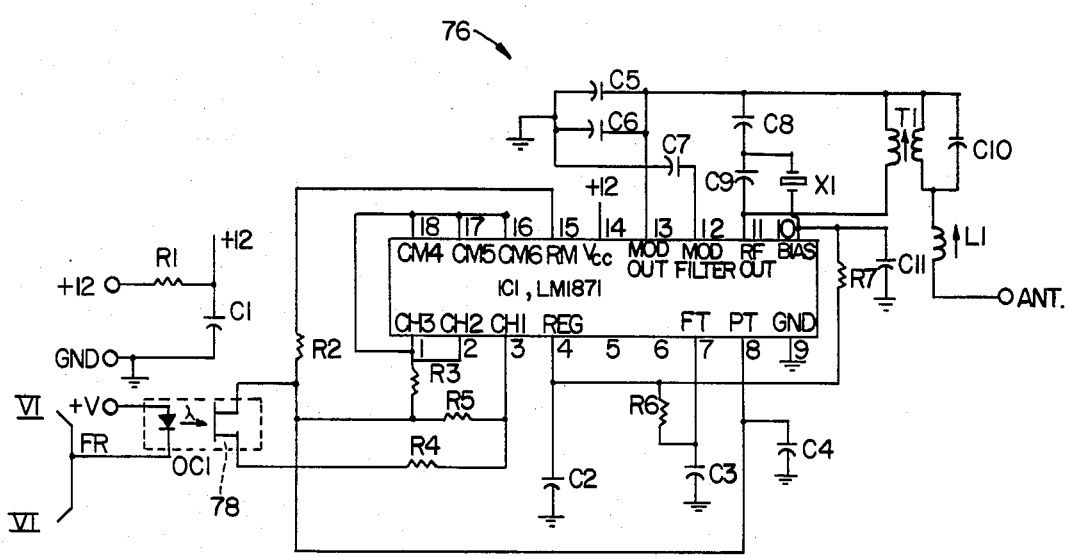
FIG. 7 is connected along line VI—VI to FIG. 6 and schematically illustrates control module 7 which contains the phase control transmitter.
Figure 8:
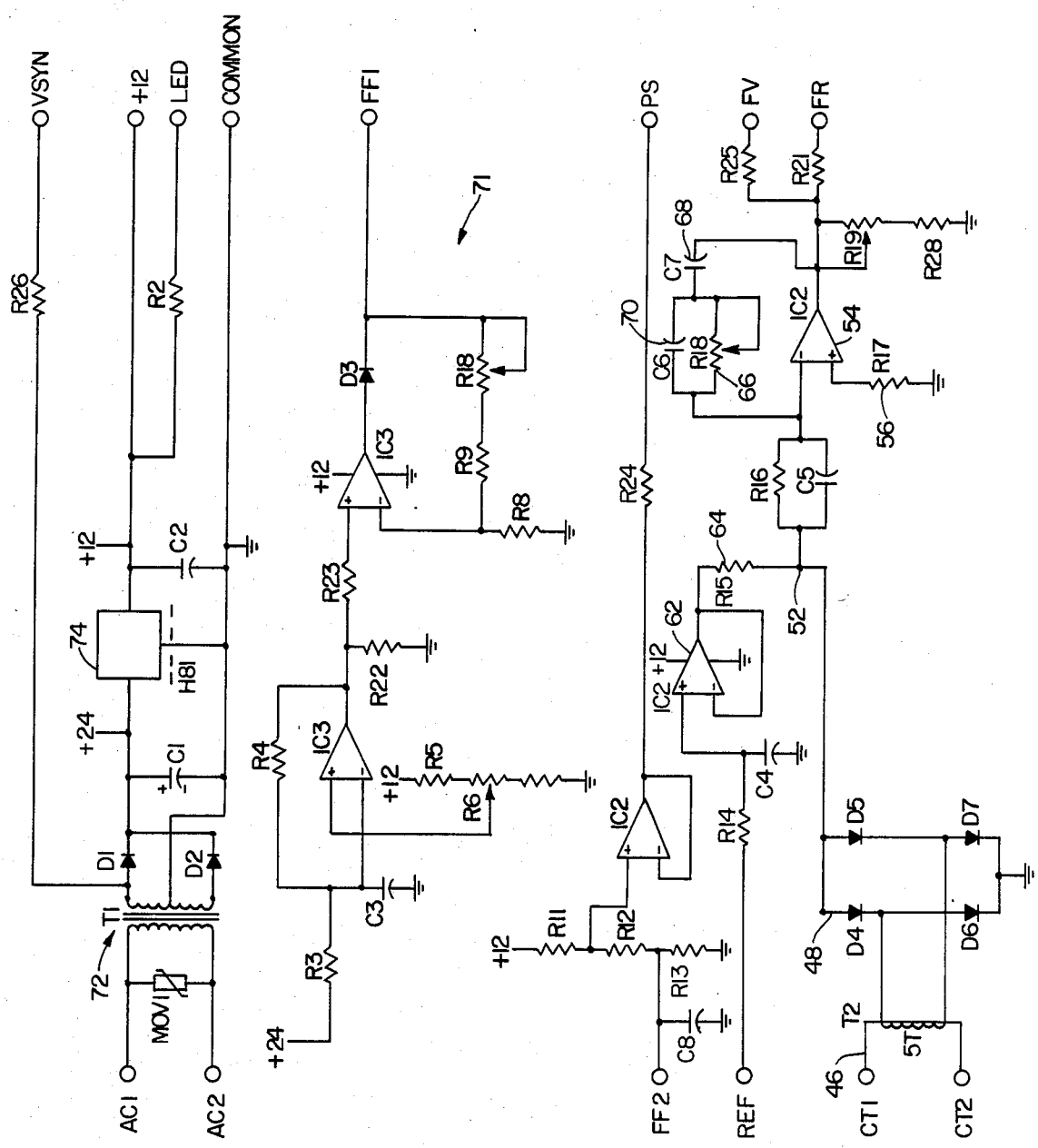
FIG. 8 is a schematic diagram similar to FIG. 6 with a field forcing circuit added.
Figure 9:
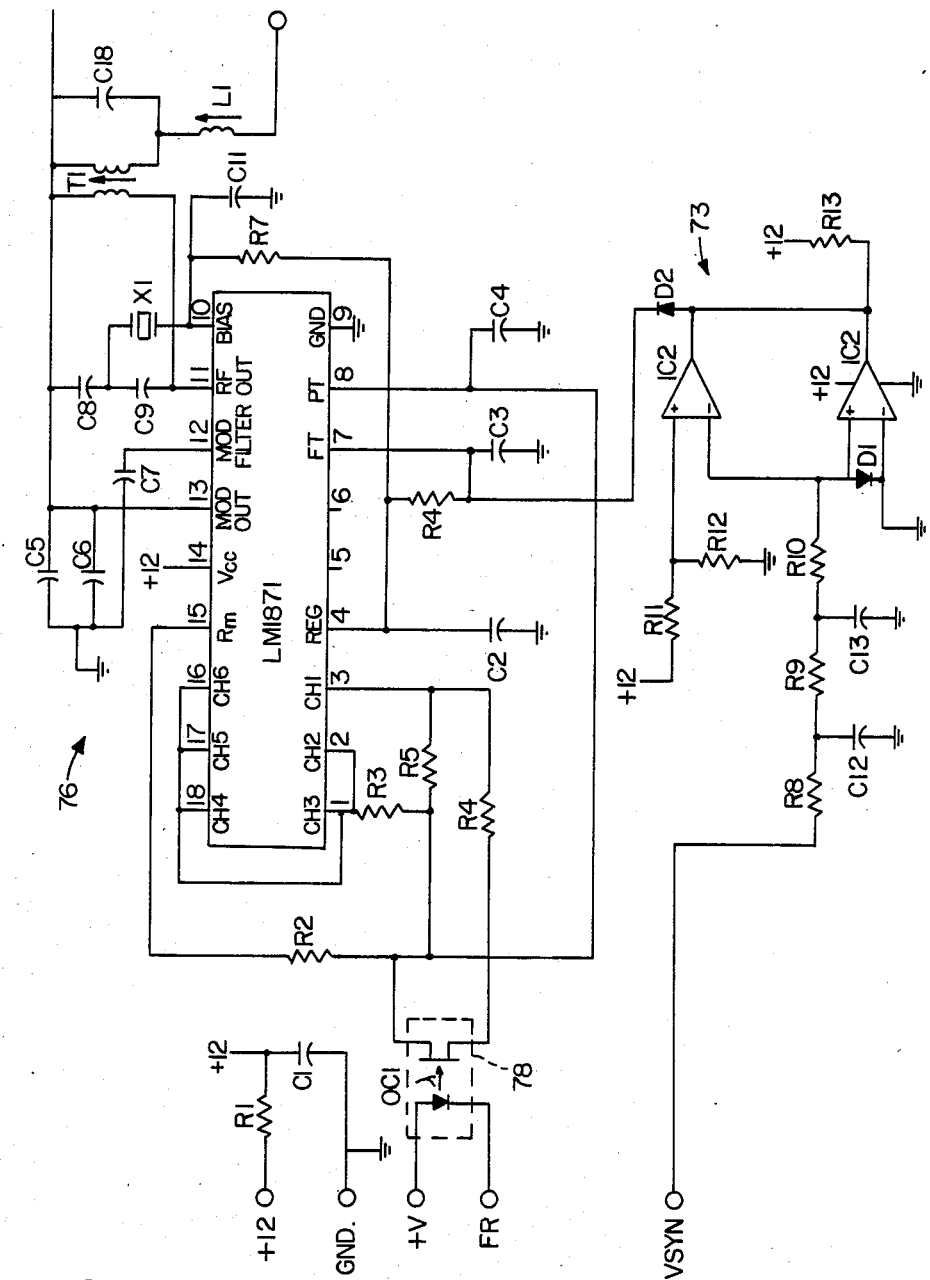
FIG. 9 is a schematic diagram similar to FIG. 7 with a line synchronizing circuit added.

Referring to FIGS. 8 and 9, the circuitry of FIGS. 6 and 7 is shown with additional features. Field forcing circuitry 71 seeks to keep the motor synchronized to the line frequency at supplying extra field current. The transmitter includes a line-synchronizing circuit 73 so that the current error signal is transmitted once for each half cycle of line frequency. This technique is useful to provide stable operation for a system in which the d.c. excitation current or sampled feedback current may contain large ripple current or large departures from an ideal square respectively. The phase angle of current error transmission may be so controlled that it never occurs at the firing points for SCR's 20 and 22, thus removing the possibility of SCR firing interference disturbing the signal transmission.

Referring to FIG. 7, the error signal on line FR from the regulating amplifier 54 is connected to a transmitter 76. The transmitter 76 is based upon an integrated circuit transmitter circuit which both encodes and transmits the signal, such as the National Semi-Conductor LM-1871. The error signal which is received from module 6 over line FR is converted to a variable resistance by means of field effect transistor 78. This converted error signal is, in turn, converted to a variable pulse width by the LM-1871-IC. The variable pulse width plus other channeled information then modulates a carrier signal which is preferably 49 megahertz. The modulated carrier is transmitted from a two-foot section of wire serving as an antenna. The transmitter signals travel a short distance to the rotating antenna of module 5.

Figure 5:
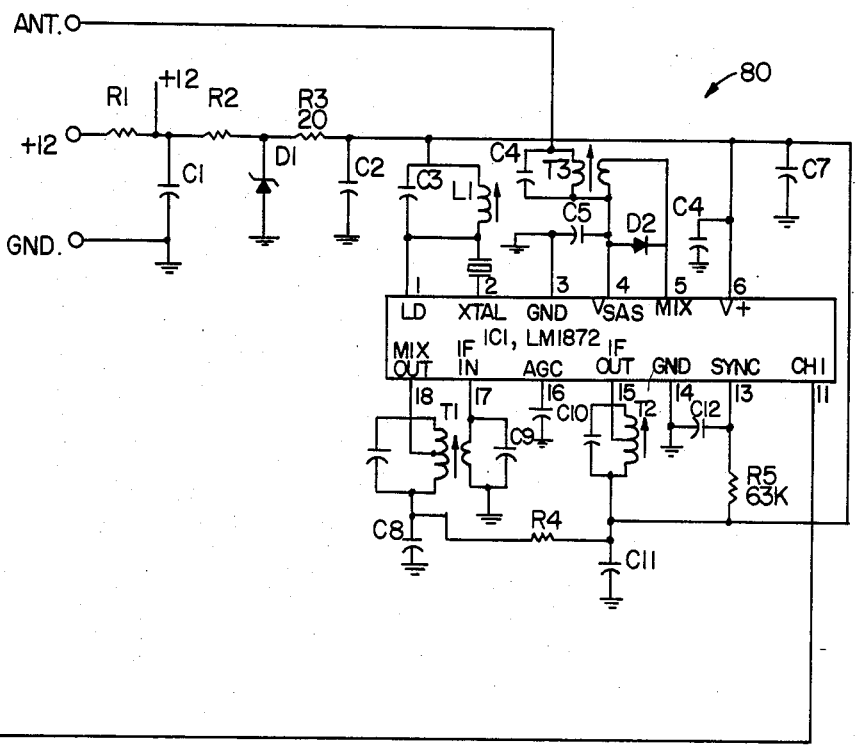
FIG. 5 is connected along line IVa—IVa to FIG. 4a and schematically illustrates control module 5 which contains the phase control receiver.
Figure 5:
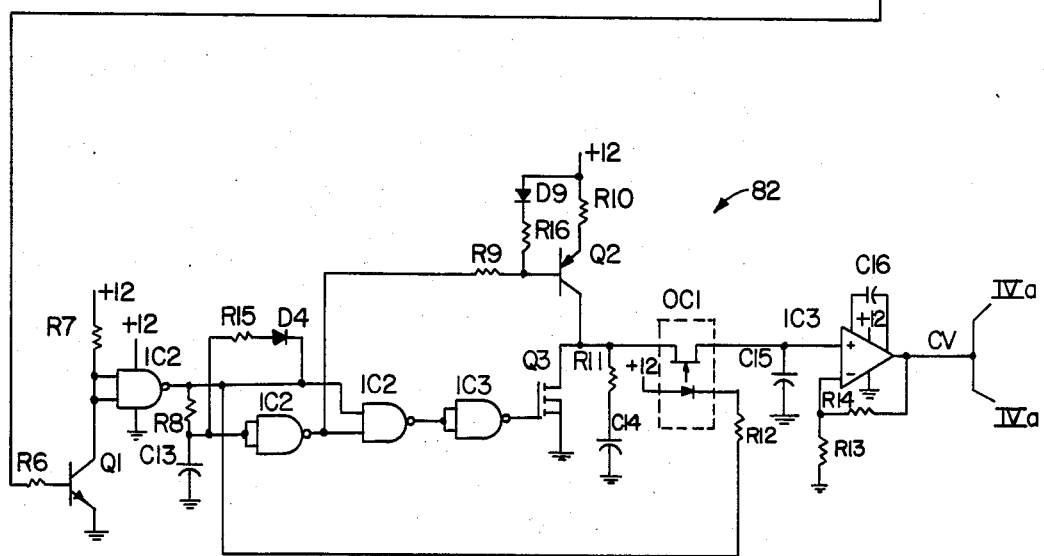

Referring to FIG. 5, module 5 contains a receiver 80. The signal from the transmitter 76 is received by the rotating antenna of the receiver 80. The received signal is demodulated and the variable pulse width is outputted by the receiver which is based on a National Semi-Conductor LM 1872 integrated receiver circuit. In the preferred embodiment pin 11 of LM 1872 is used as the output pin. The receiver output circuit 82 is connected to pin 11 of the LM 1872-IC which converts the variable pulse width to a variable d.c. level. This reconstituted error signal is output over line CV to module 4 which contains the phase control circuit.

Figure 4A:
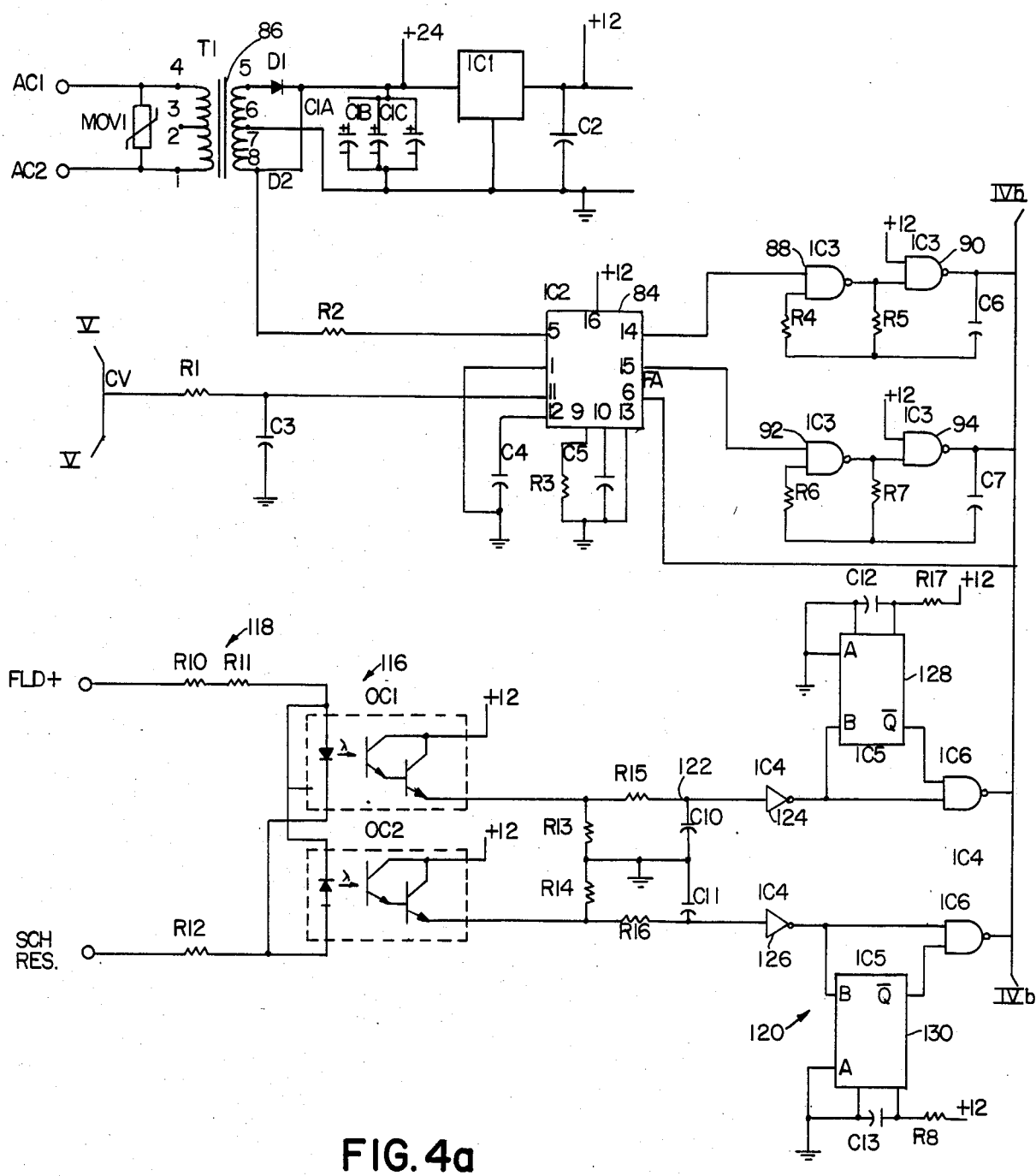
FIGS. 4a and 4b schematically illustrate control module 4 which contains the power supply, phase control, isolator and field application circuits
Figure 4B:
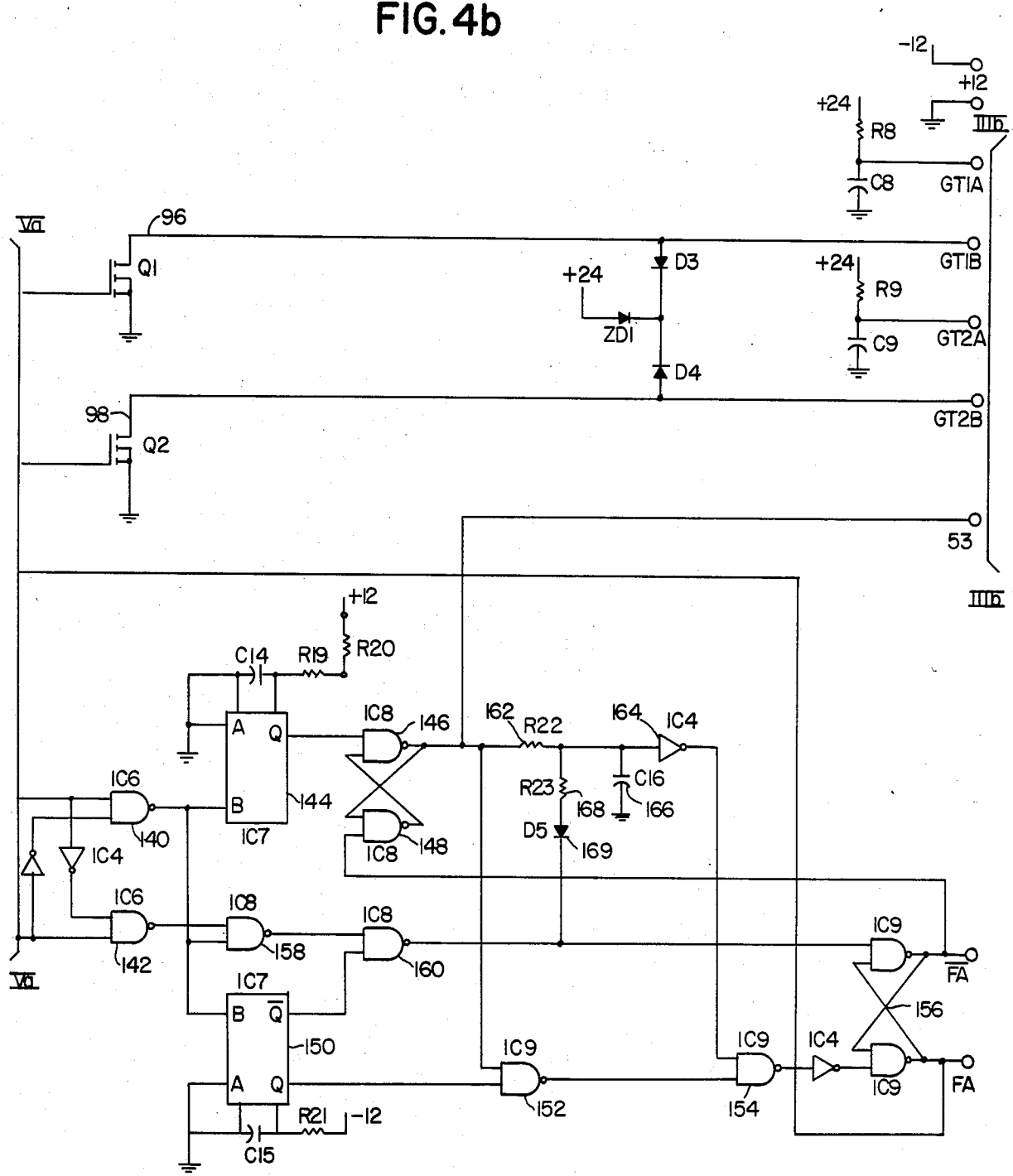

Referring to FIGS. 4a and 4b, the phase control signal carried over line CV is received by a phase control integrated circuit 84 which is standard integrated circuit for this purpose. The phase control integrated circuit 84 is synchronized to the a.c. lines through transformer 86 which is connected to the secondary of the rotating transformer 18. The phase control IC 82 produces output pulses on pins 14 and 15 of integrated circuit 84 which is preferably a Siemens TCA780 or TCA785 integrated circuit. The leading edges of the pulses at pins 14 and 15 are controlled by the control voltage input from line CV with reference to the synchronizing voltage from transformer 86. An additional input to the phase control IC 84 is a field application signal over line FA. This signal, when low, blocks out the output pulse as required during synchronous machine starting. NAND gates 88, 90, 92 and 94 form free-running astable circuits which chop the output pulses of the phase control IC into higher frequency pulse trains suitable for SCR firing. The pulse trains control power switches 96 and 98 which are the output drives for the gate pulse transformer of rectifier SCRs 20 and 22.

Figure 3B:
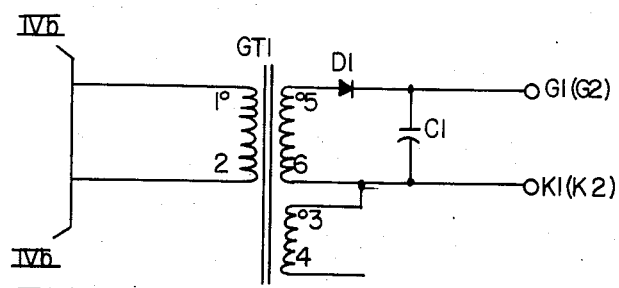
FIGS. 3a and 3b schematically illustrate identical control modules 2 and 3 which contain gate transformer and snubber circuitry with FIG. 3b connected along line IVb—IVb to FIG. 4b.
Figure 3A:
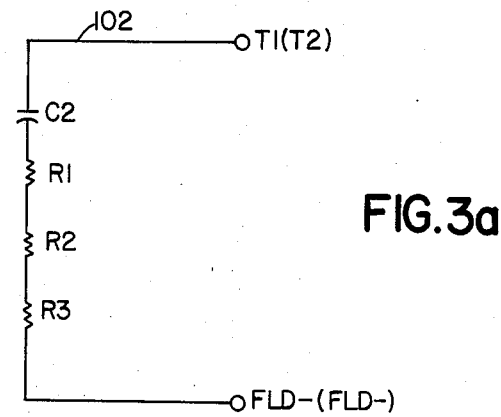

FIG. 3b shows the gating circuit in more detail so that the connection of the gate pulse transformers 100 can be clearly seen. The gate pulse transformer circuit 100 is one of two identical gate pulse transformer circuits, one of which is contained in module 2, the other of which is contained in module 3. FIG. 3a illustrates a snubber circuit 102 which serves to control voltage transients across the SCR's. Again, there is one of these snubber circuits for control module 2 and one for control module 3.

Figure 2B:
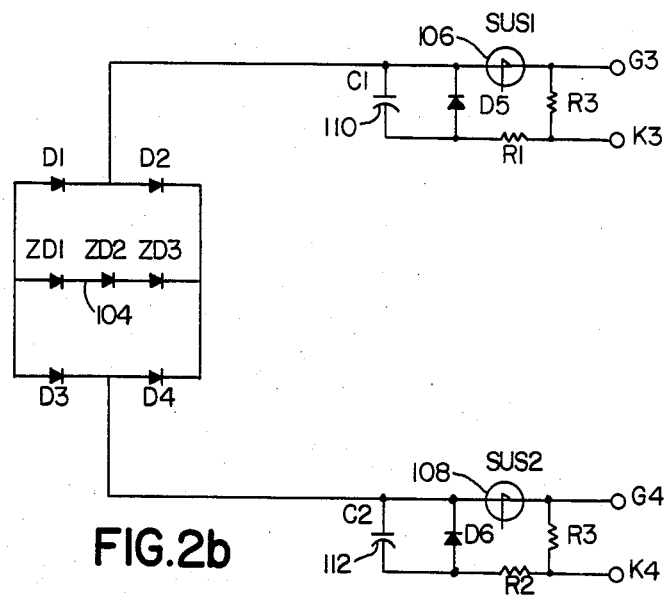
FIGS. 2a and 2b schematically illustrate control module 1 which contains a field discharge control circuit and a snubber.
Figure 2A:
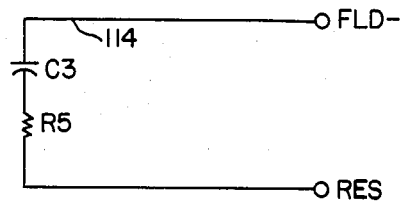

Referring to FIGS. 2a and 2b, which are contained in control module 1, it is seen that SCR's 24 and 26 do not require gate pulse transformers since their gate circuit is directly connected. The gate circuit for field discharge control is illustrated in FIG. 2b. The gate pulses are generated in the response to the instantaneous voltage level appearing across SCRs 24 and 26. Where the SCR voltage exceeds the breakdown voltage of the series string of zener diodes 104, a gate pulse is generated at the gate of SCR with the positive anode voltage. The combination of unilateral switch 106 or 108 and capacitors 110 or 112 serve to give the gate pulse a high amplitude, sharp rising leading edge. The conduction of SCR's 24 and 26 causes current to flow through the power discharge resistor 28. A snubber circuit 114 controls the voltage transients across SCR's 24 and 26.

Referring to FIGS. 1 and 4, an optoisolator 116 senses the voltage drop across the discharge resistor 28 and produces two signals relating the presence, polarity and frequency of the discharge current. The presence, frequency and polarity of the induced voltage is information required by the field application control circuitry. The optoisolator 116 is the interface between the induced voltage appearing across the discharge resistor 28 and the digital logic circuits. A resistor or string of resistors 118 determine the LED current derived from the induced voltage. The LED light emission couples to the Photo Darlington transistor outputs of the optoisolator. There is a light emitting diode for each polarity of induced voltage. The input portion of the field application control consists of a signal conditioning circuit 120 which serves to remove any false signals. The signal conditioning includes passing the signals through an RC filter 122 and passing each signal through a respective shaping inverter 124 or 126. Each shaped signal is then passed through a respective high frequency blocking and complement checking circuit 128 or 130. High frequency blocking is accomplished by passing each signal through a monostable, the output of which is the input of a NAND gate and passing the signal directly to the NAND gate. The periods of the monostables are set to a preselected value and when the output signals of the monostables are combined with the signals through the NAND gates the overall function is to prevent any input signal that will cause a state changed within a shorter time than the time period of the monostable. This effectively blocks frequencies greater than a predetermined value. The filtered signal appears at one input of NAND gate 140 and the complement appears at the other input of NAND gate 140 and similarly the signal appears at one input of NAND gate 142. The outputs of NAND gate 140 and 142 are the conditioned outputs.

The output from NAND gate 140 is input to a slip detector and latch circuit which includes a monostable 144 and a latch comprised of NAND gates 146 and 148 with the output of each NAND gate connected to the input of the other NAND gate. The input of NAND gate 146 is the output of monostable 144 and the input of the other NAND gate 148 is the complement of the signal on the field application line. The slip detector compares the period of the discharge signal to the period generated by the monostable 144. The latch circuit is set when the discharge period is greater than the monostable period. This circuit indicates that the machine slip is low enough for synchronizing. Monostable 144 is triggered by the falling edge of the signal input from NAND gate 140. The monostable 144 is preferably a retriggerable type which means that it will start timing each time it is triggered even though it may not have completed the previous timing period. The monostable 144 is set to have a period equal to the period of the slip at which synchronization is to be performed. When the actual slip frequency is slightly less than the set frequency, a train of narrow zero level pulses will appear at the output of the monostable. A low level pulse will set the latch circuit so that a high level will be present at the output of NAND gate 146. This signal indicates that set slip has been obtained. The latch circuit is reset after field application.

Also needed for optimum field application is the proper angle signal. The proper angle signal is provided by a proper angle detector which produces a ten millisecond pulse at the zero crossing of the discharge current when its polarity is such that it flows into the positive terminal of the field winding. This pulse indicates the proper angle for synchronization. The simultaneous occurrence of both proper angle and slip are required for synchronization. The proper angle for field application occurs at the time that the induced field current is traversing a zero crossing from negative to positive. This is represented by the positive edge of the input signal which, when complemented by the input signal conditioning circuit, triggers monostable 150. The output of the monostable is a 10 millisecond pulse which indicates proper angle and determines the allowable time to shut off the field discharge circuit and initiate d.c. field current. However, set slip must be reached first before any of the proper angle signals initiate field application.

The set logic includes NAND gates 152 and 154 wherein the output of NAND gate 152 is one input of NAND gate 154. The other input of NAND gate 154 comes from a timer which will be explained below. The inputs of NAND gate 152 are the output of NAND gate 146 and the output of monostable 150. The set logic looks for the occurrence of set slip and proper angle at the same time. When this occurs, the field application latch 156 is set by the complemented signal from the output of NAND gate 154. Then the FA signal goes to a high level and field application occurs.

Reset logic is connected to the reset input of the latch 156. The reset logic includes NAND gate 158 and NAND gate 160. The inputs of NAND gate 58 are the outputs of NAND gates 140 and 142 from the signal conditioning circuitry. The inputs to NAND gate 160 are the output from NAND gate 158 and the complementary output from monostable 150. The reset logic detects the presence of discharge current from the outputs of the signal conditioning circuit and resets the field application when there is discharge current, with the exception of the 10 milliseconds when the proper angle signal is present. The 10 millisecond period is the time allowed for the commutation of the discharge path when synchronization is attempted.

The final circuit of the field application control is the timer circuit, which includes a resistor 162, which is connected to the output of NAND gate 146 on one end and on the other end to an inverter 164. Capacitor 166 is connected between ground and the junction of resistor 162 and inverter 164. A resistor 168 is connected to the junction of resistor 162 and inverter 164 and a diode 169 is connected in series with resistor 168. The cathode of the diode is connected to NAND gate 160 which is part of the reset logic and also to the reset input of the latch. The output of the inverter 164 is connected to one of the two inputs of NAND gate 154 which is part of the field application set logic. The timer circuit provides for field application after two seconds have passed since proper slip was attained. This provision is required for lightly loaded machines which attain synchronization by reluctance torque.

While operation of the brushless exciter for controlling the excitation of a synchronous machine is believed to be apparent from the foregoing description, a few brief comments will subsequently be made about the operation of the brushless exciter. During starting, the field winding 12 is closed through a discharge resistor 28 and, just before or after synchronization, the field discharge resistance circuit is opened to avoid current drain from the excitation source. The excitation power source is the primary winding 16 of a rotating transformer 14. The rotating transformer provides a fast responding source of power which is independent of rotation. It is capable of providing full rated output at standstill.

SCRs 24 and 26 control the discharge energy of the field 12 through synchronous starting. This energy is dissipated by the discharge resistor 28. Control module 1 is the field discharge module which is connected to the gates of SCRs 24 and 26. The first module controls the firing of the third and forth SCRs 24, 26 in response to sensing the reduced field voltage. This operation of sensing the reduced field voltage is independent of the rest of the control circuitry. Impulses are generated in response to the instantaneous voltage levels appearing across SCRs 24 and 26. When the SCR voltage exceeds the breakdown voltage of the series string of diodes 104, the gate pulse is generated at the gate of the SCR with the positive anode voltage. The conduction of SCRs 24 and 26 causes current to flow through the power discharge resistor 28. The snubber circuit 114 controls the voltage level across SCRs 24 and 26. The level of the voltage signal which initiates the firing of SCRs 24 and 26 is higher than the d.c. field voltage applied after synchronizing. Thus, SCRs 24 and 26 will not turn on after field excitation is applied.

Control modules 2 and 3 are connected to the SCRs 20 and 22. Gate pulses are generated in response to the instantaneous voltage level appearing across SCRs 24 and 26. When the SCR voltage exceeds a certain breakdown voltage, a gate pulse is generated at the gate of the SCR with a postive anode voltage. SCRs 20 and 22 control the application of field current and a level of excitation.

The forth control module monitors the presence, frequency and phase angle of the discharge current for determining the time for field application and removal. The excitation current is monitored on the primary winding of the rotating transformer 14. The field regulator circuit compares the sampled excitation current to an externally supplied design value and generates an error signal. Control modules 5, 6 and 7, a transmitter receiver combination, couples the error signal into the rotating circuits. There, the phase control circuit converts the error signal to properly timed firing impulses for SCRs 20 and 22 after synchronization has been achieved.

It will now be appreciated that there has been presented an exciter for controlling excitation of a synchronous machine which does not use brushes. Instead, a rotating transformer is used as an excitation source for supplying unidirectional current to the field winding. The rotating transformer has a center-tapped secondary winding which enables the power components to be minimized. Only four power SCRs are used in this construction. Because the present invention uses only four SCRs, as compared to five or more in the prior art, less heat is generated and a simpler heat sink can be utilized.

Control modules 1, 2 and 3 are preferably mounted on the heat sink and control modules 4 and 5 may also be mounted on the heat sink. Modules 1 through 5 are rotating components. Modules 6 and 7 are not rotating components and may be conveniently mounted outside of the rotating structure. Control module 6 controls the rotating exciter output and provides field forcing. Since control module 6 is not a rotating component it may take the form of a stationary control box.

Field forcing is an important function of the present invention. It is possible for the stator voltage to decrease due to a drop in line voltage or other reason. The field forcing aspect of the present invention seeks to keep the motor synchronized to the line frequency during such a voltage drop. This is accomplished by automatically supplying extra field current through the field forcing circuit. For example, suppose the line voltage drops 10% so that it is only 90% of its rated value, then the field forcing circuit would automatically supply current to the field winding to increase the field voltage. This tends to increase the line voltage because of the leading power factor. Thus, the field forcing helps to keep the motor synchronized to the line frequency.

In addition to field forcing, field removal and reapplication during pull out and resynchronization are also provided. The fourth control module monitors the presence, frequency and phase angle of the discharge current for determining the time for field application and removal. The fourth control module is connected to the 5th, 6th and 7th control modules. The 6th control module contains the field forcing circuit and the transformer 46 which produces a sample current level which are both input to the regulating amplifier 54. The regulating amplifier 54 gives the field regulating signal on line FR which is input to module 7 and transmitted from module 7 to module 5 where it is transformed to a control voltage and input to module 4 over the CV line. Thus, the sampled excitation and the field forcing signal are handled by the same circuitry.

The phase control signal carried over line CV is received by a phase control integrated circuit which is synchronized to the AC lines through transformer 86 which is connected to the secondary of the rotating transformer. The phase control circuit produces output pulses the leading edges of which are controlled by the control voltage input from line CV with reference to the synchronizing voltage from the transformer 86. An additional input to the phase control circuit is a field application signal over line FA which, when low, blocks the output pulses are required during synchronous machine operation. NAND gates form free running astable circuits which chop the output pulses of the phase control into higher frequency plus trains suitable for SCR firing. The pulse trains control power switches which are the output drives for the gate transformer of SCR's 20 and 22.

The opto-isolator 116 sets the voltage drop across the discharge resistor and produces two signals related to the presence, polarity and frequency of the discharge current which is information required by the field application control circuitry. The opto-isolator is the interface between the induced voltage appearing across the discharge resistor and the digital logic circuits.

The digital logic circuits which are contained in module 4 include input signal filtering and conditioning circuitry, a slip detector, a latch, a proper angle detector, a field application set logic circuit, a field application latched output circuit and a timer. The input signal filtering and conditioning circuitry senses the presence of field discharge resistor current to inhibit the application of d.c. field current. The slip detector and latch circuitry senses the frequency of the discharge current and compares it with a preset value. The proper angle detector senses the proper angle of discharge current by detecting a negative-to-positive current zero crossing. The field application set logic enables the d.c. field current application after proper slip is attained and the proper angle exists. The proper angle detector and reset logic removes d.c. field current if discharge current continues or begins to flow after 10 milliseconds of field application. The field application set logic re-applies field current following pull-out after proper conditions of angle and slip exist. Finally, the timer applies d.c. field current after two seconds following reluctance synchronization.

The slip detector compares the period of the discharge signal to the period generated by monostable 144. The latter circuit is set when the discharge period is greater than the monostable period. This circuit indicates that the machine slip is low enough for synchronizing. When the actual slip frequency is slightly less than the set frequency, a train of narrow zero level pulses will appear at the output of the monostable. A low level pulse will set the latch circuit so that a high level will be present at the output of NAND gate 146 which indicates that set slip has been obtained. The latch circuit is reset after field application.

The proper angle detector produces a 10 millisecond pulse at the zero crossing of the discharge current when its polarity is such that it flows into the positive terminal of the field winding. This pulse indicates the proper angle for synchronization. The simultaneous occurrance of both proper angle and slip are required for synchronization. The proper angle for field application occurs at the time that the induced field current is transversing a zero crossing from negative to positive. Set slip must be reached first before any of the proper angle signals initiate field application. The reset logic detects the presence of discharge current from the outputs of the signal conditioning circuit and resets the field application when there is discharge current, with the exception of the 10 milliseconds when the proper angle signal is present. The 10 millisecond period is a time allowed for the commutation of the discharge pad when synchronization is attempted. The timing circuits provide for field application after two seconds have passed since proper slip is attained. This provision is required for lightly load machines which attain synchronization by reluctance torque.

It will now be understood that there has been presented a brushless exciter for controlling excitation of a synchronous machine which minimizes power components by using only 4 SCRs. The use of only 4 SCRs means that less heat is generated and results in a simpler heat sink. Seven control modules are provided, 3 of which are preferably mounted on the heat sink and another 2 can be mounted on the heat sink for a total of 5 rotating modules. The other 2 modules are not rotating components and may take the form of a control box which can be conveniently located. Field forcing is provided which automatically supplies extra field current to keep the motor synchronized. Field removal and reapplication during pull out is also provided by the present invention.

As will be evident from the foregoing description, certain aspects of the invention are not limited to the particular details of the examples illustrated, and it is therefore contemplated that other modifications or applications will occur to those skilled in the art. It is accordingly intended that the claims shall cover all such modifications and applications as do not depart from the true spirit and script of the invention.

What is claimed as new and desired to be secured as Letters Patent is:

1. A brushless exciter for controlling excitation of a synchronous machine, comprising:
    a center tapped rotating transformer;
    a discharge resistor;
    a field winding having one end coupled to the ends of the rotating transformer and the other end connected to the discharge resistor and center tap of the rotating transformer;
    a first SCR and a second SCR each connected in series with and between the field winding and rotating transformer;
    a third SCR and a fourth SCR each connected in series with and between the field winding and the discharge resistor and connected antiparallel to one another;
    first means, connected to the gates of the third and fourth SCRs, for controlling the firing of the third and fourth SCRs in response to sensing the induced field voltage;
    second means, connected to the gate of the first SCR, for controllably firing the first SCR and controlling the application of field current and level of excitation;
    third means, connected to the gate of the second SCR, for controllably firing the second SCR and controlling the application of field current and level of excitation; and
    fourth means, connected to the first, second and third means, the field winding, the discharge resistor and the center tapped rotating transformer, for monitoring the presence, frequency and phase angle of the discharge current and determining the time for field application and removal.

2. A brushless exciter according to claim 1, including fifth means connected to the fourth means;
    sixth means, connected to the rotating transformer, for comparing the magnitude of a sampled excitation current to a reference magnitude and generating an error signal when the magnitude of the sampled current differs from the reference magnitude; and
    seventh means, coupled to the fifth means and connected to the sixth means, for coupling the error signal to the fourth module means.

3. A brushless exciter according to claim 1, including comparing means, connected to the rotating transformer, for comparing the magnitude of a sampled excitation current to a reference magnitude and generating an error signal when the magnitude of the sampled current differs from the reference magnitude and delivering the error signal to the fourth means.

4. A brushless exciter according to claim 1, including means, connected to the fourth means and rotating transformer for comparing the magnitude of a sampled excitation current to a reference magnitude and generating an error signal when the magnitude of the sampled current differs from the reference magnitude.

5. A brushless exciter according to claim 1, wherein the first means includes a full wave diode rectifier bridge with a string of series zener diodes connected between the common anode and cathode of the bridge wherein a gate pulse is generated at the gate of the SCR having a positive anode voltage in response to the SCR voltage exceeding the breakdown voltage of the series string of zener diodes.

6. A brushless exciter according to claim 5, including a unilateral switch and a capacitor connected to either side of the bridge to give the gate pulse a high amplitude, sharp rising leading edge.

7. A brushless exciter according to claim 1, wherein the second means includes a snuffer circuit for controlling transients across the SCR, said snubber circuit having a resistor and a capacitor connected in series with each other and connected in parallel with the SCR.

8. A brushless exciter according to claim 1, wherein the second means includes a gate pulse transformer connected to the gate of the SCR.

9. A brushless exciter according to claim 1, wherein the fourth means includes an opto-isolator which senses the voltage drop across the discharge resistor and produces first and second signals relating to the presence, polarity and frequency of the discharge current.

10. A brushless exciter according to claim 9, including a signal conditioning circuit for removing any false signals from the first and second signals, said signal conditioning circuit including an RC filter, a signal shaper, a high frequency blocking circuit and a complement checking circuit.

11. A brushless exciter according to claim 9, including a signal conditioning circuit for receiving the first and second signals and removing any false signals.

12. A brushless exciter according to claim 11, wherein the signal conditioning circuit includes:
    a first resistor connected to the output of the opto-isolator for receiving the first signal;
    a second resistor connected to the output of the opto-isolator for receiving the first signal and a capacitor connected in series with the second resistor and connected to ground, said first resistor being connected to ground;
    an inverter connected to the second resistor and first capacitor;
    a third resistor having one end connected to the output of the second opto-isolator for receiving the second signal and having its other end grounded;
    a fourth resistor having one end connected to the output of the opto-isolator and having its other end connected to a second capacitor, the other end of the second capacitor being grounded;
    a second inverter connected to the junction of the fourth resistor and second capacitor;
    a first monostable having its input connected to the output of the first inverter;

a first NAND gate having its inputs connected to the output of the first inverter and the complementary output of the monostable;

a second monostable having its input connected to the output of the second inverter;

a second NAND gate having its inputs connected to the output of the second inverter and the complementary output of the second monostable;

a third NAND gate having one input connected to the output of the first NAND gate; and a fourth NAND gate having one input connected to the output of the second NAND gate and its second input coupled to the first input of the third NAND gate, the second input of the third NAND gate being coupled to the first input of the fourth NAND gate.

13. A brushless exciter according to claim 12, including a slip detector which compares the period of the output signal from the third NAND gate to the period generated by a monostable and produces an output when the period exceeds the period generated by the monostable.

14. A brushless exciter according to claim 13, including a latch circuit which is set when the discharge period is greater than the monostable period.

15. A brushless exciter according to claim 12, including a proper angle detector which receives the output signal from the third and fourth NAND gates and produces a pulse at the zero crossing of the discharge current when its polarity is such that it flows into the positive terminal of the field winding.

16. A brushless exciter according to claim 15, including an output latch which senses the simultaneous occurrence of both proper angle and slip and produces an output permitting field application.

17. A brushless exciter according to claim 12, including a reset circuit which detects the presence of discharge current and resets the output latch when there is current except for the ten milliseconds when the proper angle condition exists.

18. A brushless exciter according to claim 12, including a timer which provides for field application after two seconds since proper slip was attained.

19. A brushless exciter according to claim 1, including field forcing means for increasing excitation current.

20. A brushless exciter according to claim 2, including a line synchronizing circuit for transmitting the current error signal once for each half cycle of line frequency.

21. A brushless exciter according to claim 2, including means for controlling the phase angle of current error transmission so that it never occurs at the firing points of the first and second SCR's thereby preventing SCR firing interference from distrubing the signal transmission.

22. A modular exciter for controlling excitation of a synchronous machine, comprising:

a center tapped rotating transformer;

a discharge resistor;

a field winding having one end coupled to the ends of the rotating transformer and the other end connected to the discharge resistor and center tap of the rotating transformer;

a first SCR and a second SCR each connected in series with and between the field winding and rotating transformer;

a third SCR and a fourth SCR each connected in series with and between the field winding and the discharge resistor and connected to each other forming a loop with the anode of one SCR connected to the cathode of the other SCR;

a first control module means, connected to the gates of the third and fourth SCRs, for controlling the firing of the third and fourth SCRs in response to sensing the induced field voltage;

a second control module means, connected to the gate of the first SCR, for controllably firing the first SCR and controlling the application of field current and level of excitation;

a third control module means, connected to the gate of the second SCR, for controllably firing the second SCR and controlling the application of field current and level of excitation; and a fourth control module means, connected to the first, second and third control module means, the field winding, the discharge resistor and the center tapped rotating transformer, for monitoring the presence, frequency and phase angle of the discharge current and determining the time for field application and removal.

23. A modular exciter according to claim 22, including a fifth control module means connected to the fourth means;

a sixth control module means, connected to the rotating transformer, for comparing the magnitude of a sampled excitation current to a reference magnitude and generating an error signal when the magnitude of the sampled current differs from the reference magnitude; and a seventh control module means, coupled to the fifth means and connected to the sixth means, for coupling the error signal to the fourth module means.

24. A modular exciter according to claim 22, including a control module means, connected to said fourth means and rotating transformer, for comparing the magnitude of a sampled excitation current to a reference magnitude and generating an error signal when the magnitude of the sampled current differs from the reference magnitude.

25. A modular exciter according to claim 22, including field forcing for increasing excitation current.

26. A modular exciter according to claim 23, including a line synchronizing circuit for transmitting the current error signal once for each half cycle of line frequency.

27. A module exciter according to claim 23, including means for controlling the phase angle of current error transmission so that it never occurs at the firing points of the first and second SCR's thereby preventing SCR firing interference from disturbing the signal transmission.

28. A brushless exciter for controlling excitation of a synchronous machine of the type having a rotating transformer, a discharge resistor, a field winding coupled to the rotating transformer and to the discharge resistor, a first SCR and a second SCR each serially connected to the field winding and rotating transformer, and a third SCR and a fourth SCR each serially connected to the field winding and the discharge resistor, comprising:

first means for controlling the firing of the third and fourth SCRs in response to sensing the induced field voltage;

second means for controllably firing the first SCR and controlling the application of field current and level of excitation;

third means for controllably firing the second SCR and controlling the application of field current and level of excitation; and fourth means for monitoring the presence, frequency and phase angle of the discharge current and determining the time for field application and removal.

29. A brushless exciter according to claim 28, including means for comparing the magnitude of a sampled excitation current to a reference magnitude and generating an error signal when the magnitude of the sampled current differs from the reference magnitude and means for coupling the error signal to the fourth means.

30. A brushless exciter according to claim 28, including comparing means, connected to the rotating transformer, for comparing the magnitude of a sampled excitation current to a reference magnitude and generating an error signal when the magnitude of the sampled current differs from the reference magnitude and delivering the error signal to the fourth means.

31. A brushless exciter according to claim 28, including means, connected to the fourth means and rotating transformer for comparing the magnitude of a sampled excitation current to a reference magnitude and generating an error signal when the magnitude of the sampled current differs from the reference magnitude.

32. A brushless exciter according to claim 28, including field forcing means for increasing excitation current.

33. A brushless exciter according to claim 28, including a line synchronizing circuit for transmitting the current error signal once for each half cycle of line frequency.

34. A brushless exciter according to claim 29, including means for controlling the phase angle of current error transmission so that it never occurs at the firing points of the first and second SCR's thereby preventing SCR firing interference from disturbing the signal transmission.

* * * * *